United States Patent
Rothenhagen et al.

(10) Patent No.: US 10,554,160 B2
(45) Date of Patent: Feb. 4, 2020

(54) SYSTEM AND METHOD FOR OPERATING A PUMPED STORAGE POWER PLANT WITH A DOUBLE FED INDUCTION MACHINE

(71) Applicant: GE Energy Power Conversion Technology Ltd

(72) Inventors: Kai Alexander Rothenhagen, Berlin (DE); Piotr Sadowski, Berlin (DE)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 0 days.

(21) Appl. No.: 16/104,991

(22) Filed: Aug. 20, 2018

(65) Prior Publication Data

US 2019/0058426 A1    Feb. 21, 2019

(30) Foreign Application Priority Data

Aug. 18, 2017    (EP) ..................................... 17186974

(51) Int. Cl.
*H02P 9/30*    (2006.01)
*H02P 9/00*    (2006.01)
(Continued)

(52) U.S. Cl.
CPC .............. *H02P 9/305* (2013.01); *F03B 13/06* (2013.01); *H02P 9/007* (2013.01); *H02P 9/102* (2013.01); *H02P 2101/10* (2015.01)

(58) Field of Classification Search
USPC .................... 290/43, 44; 318/400.22; 363/10
See application file for complete search history.

(56) References Cited

U.S. PATENT DOCUMENTS

| | | | |
|---|---|---|---|
| 4,013,937 A | * | 3/1977 | Pelly ...................... H02J 3/1835 363/10 |
| 5,798,633 A | * | 8/1998 | Larsen ...................... H02J 3/28 307/87 |

(Continued)

FOREIGN PATENT DOCUMENTS

| | | |
|---|---|---|
| JP | 2002272191 A | 9/2002 |
| WO | 2008150907 A1 | 12/2008 |

OTHER PUBLICATIONS

European Search Report and Written Opinion dated Feb. 20, 2018 which was issued in connection with EP patent No. 17186974.6 which was filed on Aug. 18, 2017.

*Primary Examiner* — Pedro J Cuevas
(74) *Attorney, Agent, or Firm* — Wood IP LLC

(57) ABSTRACT

A system and method of operating a pumped storage power plant using a double fed induction machine with a frequency converter in a rotor circuit is disclosed. A current target value for the rotor current frequency is determined based on a target power to be transmitted between an electrical grid and the double fed induction machine depending on measured actual operating variables. A current inadmissible synchronous deadband is determined depending on variables characterizing a current state of the pumped storage power plant. The synchronous deadband is determined by a permissible minimum required rotor current frequency or speed difference of the rotor speed from the synchronous speed for the stationary operation. The converter is controlled to generate voltages and currents with the current target value of the rotor current frequency if the current target value of the rotor current frequency or speed does not fall in the current inadmissible synchronous deadband.

17 Claims, 5 Drawing Sheets

(51) Int. Cl.
*F03B 13/06* (2006.01)
*H02P 9/10* (2006.01)
*H02P 101/10* (2015.01)

(56) References Cited

U.S. PATENT DOCUMENTS

| | | | |
|---|---|---|---|
| 6,591,860 B1 * | 7/2003 | Weber | F16K 31/34 |
| | | | 137/412 |
| 6,954,004 B2 * | 10/2005 | Skeist | H02P 9/007 |
| | | | 290/44 |
| 6,984,897 B2 * | 1/2006 | Skeist | H02P 9/02 |
| | | | 290/1 R |
| 2012/0061959 A1 | 3/2012 | Yasugi et al. | |
| 2014/0361718 A1 | 12/2014 | Kageyama et al. | |
| 2019/0229546 A1 * | 7/2019 | Hartl | H02J 3/005 |

* cited by examiner

SYSTEM AND METHOD FOR OPERATING A PUMPED STORAGE POWER PLANT WITH A DOUBLE FED INDUCTION MACHINE

FIELD OF INVENTION

The present invention relates to a system and method for operating a pumped storage power plant with a double fed induction machine.

BACKGROUND OF THE INVENTION

In view of expanding networks for the generation and distribution of electrical energy with increasing number of power plants of different types and increased use of renewable energies, methods for storing electrical energy are becoming increasingly important. Pumped storage power plants are considered to be one of the most important, reliable and effective storage systems for electrical energy. In a pumped storage power plant, for example, an upper water reservoir is filled with the use of electrical energy with pumps, whereby the pumping current used is obtained in times of low grid load at relatively low prices. In times of high power demand, the potential energy of the water can then be used by means of a turbine in mechanical rotational energy to drive a generator to generate electrical energy and feed it into the electrical grid. The peak load energy gained can often be re-sold at relatively much higher prices. An efficient and low-loss use of the varying power supply of the electrical grid is of enormous importance.

The generator, which can generate the electrical energy in the turbine operation can also serve as a drive motor for the pumps or pump turbines on the same shaft. Double fed induction machines (DFIGs), which are slip ring rotor induction machines that are fed via both stator and rotor connections, are particularly suitable for motor generator devices for pumped storage power plants. In use, the stator of the induction machine is directly connected to an electrical grid, while the rotor, which is used to control the speed, active and reactive power, is connected to the grid via a frequency converter. This allows oversynchronous as well as undersynchronous operation to the grid frequency and thus the generator speed is variable. Only part of the power has to be adjusted to the desired frequency and power via the converter. To this extent, the converter can be made smaller, less expensive and with lower losses than a comparable synchronous generator, which results in a better efficiency of the overall system. Other advantages of the double fed induction machine over synchronous machines include high operating efficiency under part load, the ability to separately control reactive power and active power, power factor control capability and fast system response time.

A disadvantage of double fed induction machines is that the cyclic heat load of the components increases significantly in an operation with increasing proximity to their synchronous speed. In particular, semiconductor devices that are used in the power electronics of the converter, are prone to considerable junction temperature fluctuations, resulting from the operation of the machine close to the synchronous speed, by which the service life of the converter could be reduced. Since the frequency of the rotor current in a double fed induction machine is determined by the stator flux frequency, thus the grid frequency, and the rotor speed and an operation close to the synchronous speed results in a low rotor current frequency, these rotor currents cause considerable heat load on the semiconductor devices. In this respect, an operation within a predefined deadband around the synchronous speed for the double fed induction machine is to be avoided.

It is known that the maximum temperature of power semiconductors, such as IGBTs and diodes, that are used in the converter increase at lower rotor current frequencies and otherwise constant operating conditions. The lower the rotor current frequency, the higher the fluctuation in the junction temperature of the semiconductors, which reaches peak values when the semiconductor conducts. It is also known that close to the synchronous speed, the power losses are unevenly distributed on the half bridges of the converter.

In order to overcome these problems, various strategies have been proposed to avoid operating the double fed induction machine in a fixed deadband around the synchronous speed or to choose a different, suboptimal operating point. The inadmissible synchronous deadband is specifically determined depending upon the particular system and its components prior to commissioning. Both strategies can lead to considerable efficiency and economic losses for operators of pumped storage power plants. A wide range in which the energy of the electrical grid cannot or not optimally be used, may be unacceptable for operators of pumped storage power plants. This inadequacy therefore must be avoided or at least reduced.

Tan Yingjie et al., "Deadband Control of Doubly-Fed Induction Generator around Synchronous Speed", IEEE Transactions on Energy Conversion, Volume 31, Issue 4, pages 1610-1621, December 2016, describes a method for preventing an operation within a predefined deadband around the synchronous speed for a double fed induction machine in a wind power plant. It is proposed that a clamping circuit (so-called crowbar) provided for the overvoltage protection, which includes a series circuit of a switching element and a resistor connected between the rotor circuit and ground, be activated in the event of an operation within the predefined deadband to short-circuit the rotor via the clamping circuit. This switches the operating mode of the double fed induction generator (DFIG mode) to a pure induction generator mode (IG mode). To this end, the electromagnetic torque is also adjusted accordingly so that the operating point is shifted from the optimum operating point to a new operating point in the IG mode before the clamping circuit is activated. Thus, a continuous operation, although in a slightly suboptimal operating range, can be ensured.

SUMMARY

Against this background, it is an object of the present invention to propose measures to enable the most efficient operation of pumped storage power plants with double fed induction machines. In particular, it is an object of the invention to provide a method and a system for operating a pumped storage power plant with a double fed induction machine, which enables the provision of the best possible control power in the power control range of the machine while minimizing the efficiency and economic efficiency losses associated with the synchronous deadband.

This object is achieved by the method and the system for operating a pumped storage power plant with a double fed induction machine with the features of claim 1 or 13.

According to a first aspect of the invention, a method of operating a pumped storage power plant with a double fed induction machine is provided, which includes a stator that is directly connected to an electric grid, and a rotor which is connected to the electric grid via a converter. The method includes determining a current target value for a rotor current frequency or a mechanical speed of the rotor based on a target power to be transmitted between the electrical grid and the double fed induction machine depending on measured actual operating variables. The method further includes a determining of one or more variables characterizing a current state of the pumped storage power plant and determining a current inadmissible synchronous deadband, which is determined by a rotor current frequency required for the stationary operation or speed difference of the rotor speed from the synchronous speed, depending on one or more variables characterizing the current state of the pumped storage power plant. The method further includes controlling the converter to switch pulse-like sinusoidal voltages and currents with the current target value of the rotor current frequency to the rotor, when the current target value of the rotor current frequency or mechanical rotor speed does not fall stationary in the current inadmissible synchronous deadband.

According to the invention, the current inadmissible synchronous deadband around the rotor zero frequency or around the synchronous speed, in which a stationary operation of the double fed induction machine should be avoided in order to avoid impairments and damages to the components, is always dynamically determined during operation depending on the respective current state the pumped storage power plant. "Stationary" in this context means an operation for a period of time during which there is no noticeable overloading and possible damage to semiconductor components or other critical components used. In particular, "stationary" herein may mean any operation for a period of time in the range of the thermal time constant of the semiconductor components or other critical components used. This can be in the range of a few milliseconds to seconds. A passing of the inadmissible synchronous deadband within a relatively non-critical period of time, especially while minimizing the deadband, can be admitted.

With the invention, the synchronous deadband can thus be variably adapted to the prevailing circumstances and in particular minimized according to the current state of the power plant to allow safe operation even in the vicinity of the synchronous frequency in a portion of the control range of the induction machine, which would be impossible with a fixed predefined deadband. The power control range of the double fed induction machine and the capacity of the pumped storage power plant can thus be better utilized. This results in lower power loss or a higher efficiency and economic efficiency of the pumped storage power plant.

In the method mentioned above, the current target value of the rotor frequency or the mechanical speed or the minimum required rotor frequency or mechanical speed for stationary operation or both can be determined, for example, depending on one or more of the following currently measured operating variables: phase currents in the stator circuit, phase voltages in the stator circuit, currents on the grid side in the rotor circuit and/or rotor speed. From this, the desired rotor current and the desired rotor voltage with the target frequency or the target speed can be determined. Other variables, such as, for example, the rotor torque can also be taken into account.

The one or more variables characterizing a current state of the pumped storage power plant are continuously detected and/or determined. The current state is then continuously monitored to allow for continuous adaptation of the synchronous deadband. Alternatively, these variables can also be detected and/or determined periodically at a suitable interval in order to monitor the state of the pumped storage power plant as current as possible, or in response to detected state changes, e.g. a changed load requirement.

In order to adequately detect the current state of the pumped storage power plant, in particular one or more of the following characteristic variables can be monitored: voltages on the machine side of the converter, currents on the machine side of the converter, rotor current frequency, power factor on the machine side of the converter, voltage at a DC voltage intermediate circuit of the converter, pulse pattern for the control of the converter, clock frequency for the control of the converter, ambient temperature of the converter, cooling water temperature and/or flow rate for water cooling of the converter. All these variables affect the current state of the pumped storage power plant and in particular the thermal load of the rotor windings of the double fed induction machine and the power semiconductor switch of the converter. For example, these variables affect the height and fluctuation range of the temperature of the junction of the power semiconductor switches and thus their service life. Such relationships are well known in the state of the art and may be taken into account individually or in any combination to estimate the current state of the pumped storage power plant as accurately as possible and to determine therefrom a minimized synchronous deadband.

In order to determine the current state of the pumped storage power plant, it is also possible to use fixed parameters or influencing variables, which may include one or more of the following: type of semiconductor switches used in the converter, dimensioning of the converter, power semiconductor circuits used (e.g. snubber links) and/or thermal resistances and heat capacities within the components. These invariable variables also affect the thermal load of the power semiconductor switches and other components of the system and thus affect the current state of the pumped storage power plant.

The relationships or correlations between the variables characterizing a current state of the pumped storage power plant and the inadmissible synchronous deadband may be stored in advance as functions, look-up tables, implemented algorithms, system models or in another appropriate way and used online during operation. By using a combination of any number of such characterizing variables and relationships, the complexity for determining the optimum synchronous deadband may be selected as desired or required.

According to the embodiments of the method according to the invention, in the case that the current target value of the rotor current frequency or of the mechanical speed falls in the current inadmissible synchronous deadband, a remedial measure is introduced for continuation of the operation while preventing an operation within the deadband. Alternatively or additionally, in this case, a message to a higher-level control can be sent, which can then take appropriate remedial measures, if necessary.

In the embodiments, the remedial measure to be taken to avoid operation within the deadband is selected depending on a preference signal or parameter. The preference signal can be supplied from the outside, for example, from a central control center to the power plant and evaluated in case of need. It may also be a predetermined and stored preference parameter that specifies one or more remedies.

Alternatively or additionally, the remedial measure to be taken to avoid operation within the deadband can be determined by comparing various possible remedial measures, taking into account their effects on the inadmissible synchronous deadband and possibly other criteria, such as economic efficiency of operation.

In the embodiments of the invention, the remedial measure provides for a reduction of the current synchronous deadband by changing the state of the pumped storage power plant. This can be achieved based on one or more of the following measures: reducing a clock frequency for the control of the converter, changing the pulse pattern for the control of the converter, reducing a voltage on a DC voltage intermediate circuit of the converter, reducing the controlled reactive power of the converter, changing a cooling water temperature and/or a cooling water flow rate for water cooling of the converter and/or reducing the ambient temperature in a converter room using an air cooling system. These measures are aimed at reducing the thermal load on the semiconductor switches of the converter and/or other components involved and thus enabling continuous operation with a narrower synchronous deadband. For example, it is generally known that lower clock frequencies of the semiconductor switches of the converter result in lower maximum temperatures of the semiconductor switches. Further, it is generally known that different modulation methods for the control of the power semiconductor switches of the converter, including different pulse-width modulation (PWM) types, in different operating modes of a double fed induction machine result in different power losses of the semiconductor elements of the converter and allow different permissible output currents. This can be used to reduce the thermal load of the semiconductor elements. Furthermore, by a reduction of the control of the reactive power in the machine-side partial converter the power factor can be increased, whereby by the reduction of the current the load and the temperature, in particular on the components of the machine-side partial converter, are reduced. Overall, by a reduction of the thermal load of the components of the system its state can be changed such that the current inadmissible synchronous deadband can be further reduced without danger and a continuous operation of the power plant in a wider range can be achieved. A largely infinitely variable control of the double fed induction machine is particularly important during the pump operation.

When the state of the system is changed by one or more of the aforementioned remedial measures, this may have minor disadvantages, or cause impairments which include increased harmonics of voltages and currents connected to the rotor, higher current ripple, a lower reactive power available and increased auxiliary losses due to the water cooling or the use of an air cooling system. While the increase of the efficiency and economic efficiency of the system will generally outweigh the latter, additional compensatory measures in a further development of the method according to the invention can be provided to mitigate the disadvantages or impairments associated with the remedial measure or measures. For example, the clock frequency or the pulse pattern for the control of the converter can be changed in order to reduce harmonics and/or current ripples. Alternatively or additionally, in the case that the reactive power regulated in the machine-side partial converter is reduced in order to reduce the heat load, the smaller available reactive power range can be compensated by using a grid-side partial converter. Still further, the smaller available reactive power range and/or a reduced active power in a double fed induction machine may be compensated using at least one further double fed induction machine which is, for example, in drive connection with a further pump or turbine of the power plant system.

According to a further aspect of the invention, a system for operating a pumped storage power plant with a double fed induction machine is provided, which includes a stator directly connected to an electrical grid and a rotor connected to the electrical grid via a converter and comprising a pumping/turbine device which is drivingly connected to the double fed induction machine. In a motor operation of the double fed induction machine, the pumping/turbine device is driven by it to convert electrical energy of the electrical grid into potential energy of a pumped water, while in a generator operation inversely potential energy of the water is converted into mechanical rotational energy for driving the double fed induction machine to generate electrical energy and feed it into the electrical grid. The system for operating the pumped storage power plant includes a sensor device for the measurement of current operating variables, which include currents and voltages in a stator circuit and a rotor circuit and optionally the rotor speed. The system further includes a control device for controlling the operation of the pumped storage power plant, which is communicatively connected to the sensor device in order to obtain therefrom current measurement values of the operating variables. The control device is adapted to determine a current target value for a rotor current frequency or a mechanical speed of the rotor based on a target power to be transmitted between the electrical grid and the double fed induction machine depending on the measured actual operating variables. The control device is further adapted to determine one or more variables characterizing a current state of the pumped storage power plant and a current inadmissible synchronous deadband, which is determined by the minimum required rotor current frequency ($\Delta f$) permissible for stationary operation or speed difference ($\Delta n$) of the rotor speed from the synchronous speed, depending on the one or more variables characterizing the current state of the pumped storage power plant. The control device is further adapted to control the converter to switch pulsed sinusoidal voltages and currents with the current target value of the rotor current frequency to the rotor, when the target value of the rotor current frequency or the mechanical rotor speed does not fall in the current stationary inadmissible deadband.

Thus, the system ensures that operation in an inadmissible synchronous deadband around the stator or synchronous frequency or speed is avoided to avoid inadmissible load and impairment of components of the system and reduction of the service life thereof. The synchronous deadband is always determined current and online during operation, so that it can be variably minimized under the current conditions of the pumped storage power plant. This increases the potential power yield and efficiency of the pumped storage power plant, increases the usable power control range of the double fed induction machine and increases the economic efficiency of the system. Otherwise, the above explanations with regard to the advantages and possible further developments of the system apply here in a corresponding manner.

In particular, in the embodiments of the system, the current state of the pumped storage power plant can be estimated based on detected or determined characteristic variables, which can include one or more of the following: voltages on the machine side of the converter, currents on the machine side of the converter, rotor current frequency, power factor on the machine side of the converter, voltage on a DC voltage intermediate circuit of the converter, pulse pattern for the control of the converter, clock frequency for the control of the converter, ambient temperature of the converter, cooling water temperature and/or cooling water flow rate for water cooling of the converter and others.

The control device is then adapted to determine the current state of the pumped storage power plant based on relationships between the characteristic variables and the inadmissible synchronous deadband, whereby the relationships can be stored in advance in a memory as functions, look-up tables, implemented algorithms or in another appropriate way.

In addition, the control device can be adapted, in the case that the determined target value of the rotor current frequency falls into the impermissible synchronous deadband, to initiate a remedial measure to avoid an operation within the deadband, whereby the remedial measure comprises a reduction of the synchronous deadband by changing the state of the pumped storage power plant. To this end, one or more of the following measures can be taken: Reduction of a clock frequency for the control of the converter, changing the pulse pattern for the control of the converter, reduction of a voltage at a DC voltage intermediate circuit of the converter, reducing the controlled reactive power of the converter, changing a cooling water temperature and/or a cooling water flow rate for water cooling of the converter, reduction of the ambient temperature in one converter room using an air cooling system and others. The control device can estimate the effect of one or more of these remedial measures on the state of the pumped storage power plant and the resulting deadband and then select and initiate the appropriate remedial measure or a combination of remedial measures to continue operating at reduced synchronous deadband without risk to the components.

Thereby, the control device is adapted to select the remedial measure to be initiated in order to avoid operation within the deadband depending on a preference signal or parameter, which can be supplied from the outside, e.g. from a central control location or predetermined in advance and stored in a memory of the control device.

Alternatively, the control device can be adapted to determine the remedial measure to be taken to avoid operation within the deadband by comparing various possible predetermined remedial measures, taking into account their effects on the inadmissible synchronous deadband and optionally other criteria.

In the embodiments of any of the aforementioned systems, the converter includes a grid-side partial converter and a machine-side partial converter, which are connected to one another via a DC voltage intermediate circuit. The control device can be adapted to operate the double fed induction machine by reducing the reactive power controlled by the machine-side partial converter with reduced synchronous deadband and to compensate for the reduced available reactive power range by a modified control of the grid-side partial converter.

In the developments of the system of any of the aforementioned types, the pumped storage power plant can include a first double fed induction machine, which is connected to the electrical grid via a first converter and is drivingly coupled to a first pumping/turbine device, and at least one second double fed induction machine, which is connected to the electrical grid via a second converter and is drivingly connected to a second pumping/turbine device, whereby the control device can include a first control device associated with the first double fed induction machine and at least one second control unit, which is associated with the at least one second double fed induction machine. The first and the second control unit can be communicatively connected to each other directly or via a higher-level optimization device. They can be adapted to, as needed, cause that at least one of the double fed induction machines is operated with reduced synchronous deadband by changing the state of the pumped storage power plant, while at least one of the other double fed induction machines is operated in a normal operating mode. Alternatively or additionally, the first and the second control unit or the higher-level optimization device can be adapted to cause that an active power and reactive power requirement predefined by the electrical grid system is distributed asymmetrically to the first and the at least one second double fed induction machine to avoid an operation of the double fed induction machines in an inadmissible deadband without power loss. The decision on the remedial measure to be initiated can, as already mentioned above, in the embodiments be made depending on an externally provided preference signal or a prestored internal preference parameter or also based on effectiveness considerations.

BRIEF DESCRIPTION OF THE DRAWINGS

Further details of the embodiments of the invention ensue from the dependent claims, the drawings as well as their description. The invention is described in more detail below based on a drawing, which shows exemplary, by no means limiting embodiments of the invention, wherein the same reference signs are used in all figures to indicate the same elements. The drawings in detail:

DETAILED DESCRIPTION

Figure 1:
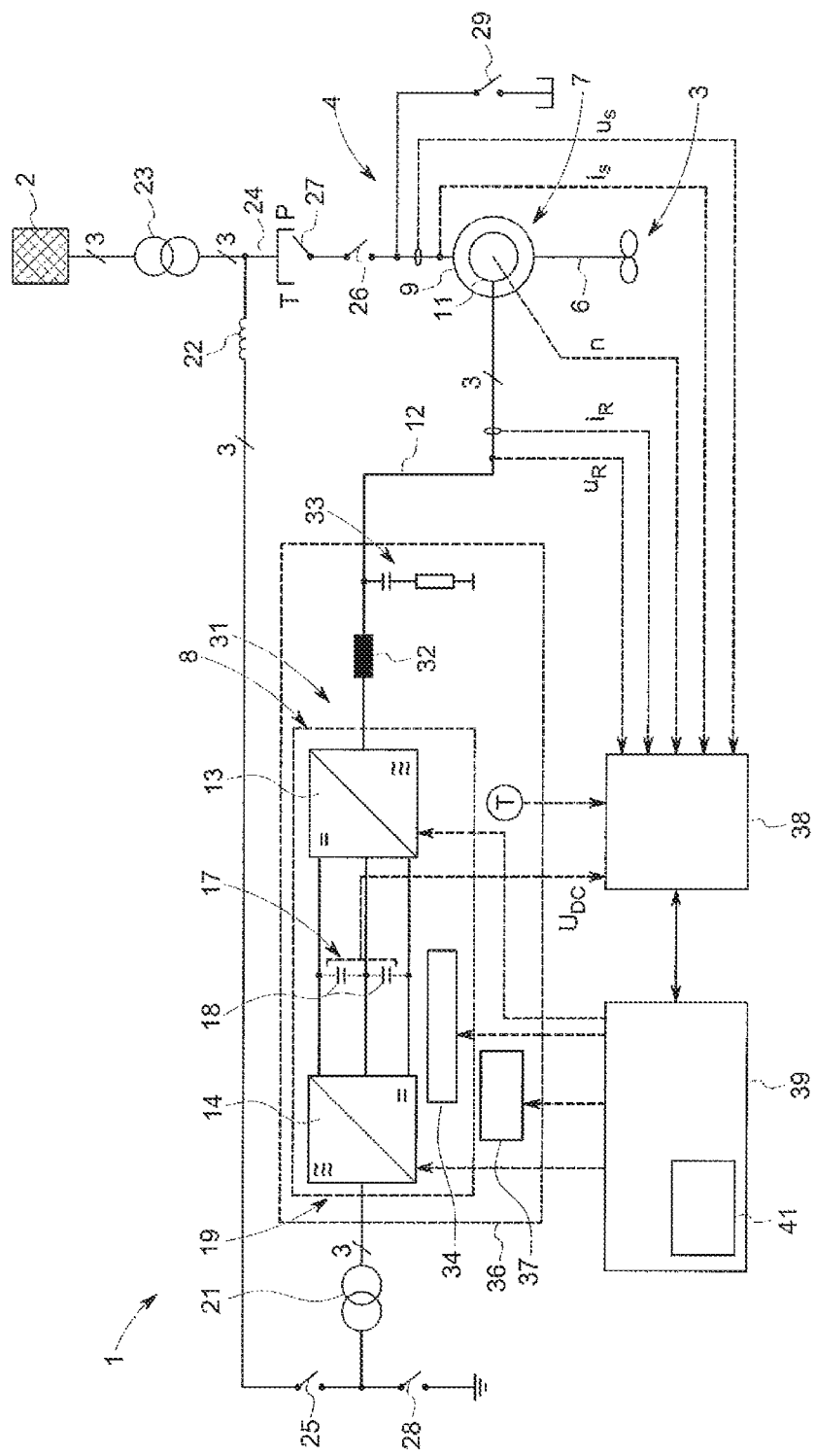
FIG. 1 shows an exemplary pumped storage power plant with a double fed induction machine according to an embodiment of the invention in the form of a strongly simplified block diagram.

In FIG. 1 is a highly simplified block diagram representation of a pumped storage power plant 1 for storing electrical energy from an electrical grid 2 in the form of potential energy of a pumped water not shown here and the refeeding of electrical energy as required, which is obtained from the potential energy of the pumped water, into the electrical grid 2. For this purpose, the pumped storage power plant 1 is provided with a pumping/turbine device 3, which is drivingly connected to a double fed induction machine 4. Although only one single pumping/turbine device is symbolically illustrated, as it is connected with the induction machine 4 via a drive shaft 6, a plurality of pumping/turbine devices can be coupled to it via a common drive shaft 6. In addition, both integrated pump turbines and separate pumps and turbines can be used, each of which is specially optimized for pumping or turbine operation.

The double fed induction machine 4 includes essentially a motor generator device 7 and a frequency converter 8. The motor generator device 7 includes in the conventional manner a stator 9, which is provided with stator windings not shown here, and a rotor 11, which is surrounded by the stator and carries rotor windings not shown here. The rotor is designed as slip ring rotor.

The induction generator 7 is fed via both stator and rotor connections, from which the designation of the double fed induction machine originates. In the configuration of the double fed induction machine 4 shown in FIG. 1, the stator is connected or connectable directly to the electrical grid 2, while the rotor circuit 12 is connected or connectable to the electrical grid 2 via the converter 8.

The frequency converter 8 is designed in a so-called back-to-back configuration with two three-phase partial converters, which include a machine-side or rotor-side partial converter 13 and a grid-side partial converter 14, which are connected to one another via a DC voltage intermediate circuit 17. The DC voltage intermediate circuit 17 here is a series circuit of capacitors 18, which are arranged between a positive and a negative connection line of the DC voltage intermediate circuit 17.

The partial converters 13, 14 are adapted to rectify the three-phase alternating voltage on one of its side and to provide it to the DC voltage intermediate circuit 17 and vice versa to invert the direct voltage of the DC intermediate circuit 17. The partial converters 13, 14 are voltage-controlled converters (so-called Voltage Source Converters, VSC) and can be two or multi-stage converters comprising a number of controllable power semiconductor switches not shown here, in particular IGBTs with antiparallel freewheeling diodes, thyristors, IGCTs, GTOs or the like, which are suitably connected to bridge circuits and can be clocked at high frequency to achieve the rectification or inversion. Various power converter configurations are well known in the state of the art that can be used here.

The grid side 19 of the grid-side partial converter 14 is connected or connectable with the electrical grid 2 via a transformer 21 and a grid filter 22 indicated here only by a throttle 22. In addition, a grid transformer 23 is arranged between the electric grid 2 and the double fed induction machine 4, which is connected to the connection point between the rotor circuit 12 and the stator circuit 24 to convert the voltage and current level of the grid 2 to a suitable voltage and current level of the induction machine 4 and vice versa.

A plurality of switches is further provided in the embodiment shown in FIG. 1, which include a first switch 25, which is disposed in the rotor circuit 12, and a second switch 26, allowing to galvanically isolate the converter 8 and the motor generator 8, as required from the grid 2, including from the grid transformer 23. A change-over switch 27, which is arranged in the stator circuit 24, serves the change-over between the turbine (T) and pump operation (P). Further, a grounding switch 28 for the grounding of the rotor circuit 12 or the stator circuit 24 as required and/or an acceleration and brake switch 29 can be provided in the motor generator device 7.

A filter arrangement is further provided on the machine or rotor side 31 of the converter 13, which includes an inductance 32 switched on in the rotor circuit and an output filter 33 with a series circuit of a resistor and a capacitor, which are connected between the rotor circuit 12 and the local ground. The filter arrangement is used to dampen unwanted oscillations and for interference suppression of the high frequencies or voltage peaks caused by switching of the semiconductor switches in the converter 8.

A water cooling indicated here by a block 34 is provided for cooling the power semiconductor switches or modules that experience a high thermal load by the high-frequency clocking. Furthermore, the converter 8 is disposed in an air-conditioned converter room 36 which houses all of the power electronics. An air cooling system 37 can be provided for the cooling of the converter room 36.

Further can be seen from FIG. 1 that the pumped storage power plant 1 includes a sensor device 38 for detecting current operating variables and a control device 39 which is communicatively connected to the sensor device 38 and is adapted to control an operation of the pumped storage power plant 1 depending on the operating variables detected by the sensor device 38. The sensor device 38 can contain a variety of voltage sensors, current sensors and other converters, which are only partially displayed here and are not individually designated for reasons of clarity. As can be seen from FIG. 1, for example, the three-phase voltages us and currents is in the stator circuit 24, the three-phase voltages $u_R$ and currents $i_R$ on the rotor side 31 of the converter 8 and the direct voltage $U_{DC}$ of the DC voltage intermediate circuit 17 can be measured. Also other electrical variables in the circuit can be measured, from which the above-mentioned currents and voltages can be derived. Optionally, the speed n of the rotor 11 can be measured. Further, the ambient temperature T is measured in the vicinity of the converter 8 in the converter room 36. These and other variables are detected by the sensor device 38, converted into associated electrical signals and transmitted to the control device 39.

The control device 39 receives the electric signals supplied by the sensor device 38, which characterize the operating variables, and based on a predetermined control logic determines control signals to control the various components of the pumped storage power plant 1. In particular, the control device 38 controls the power semiconductor switches of the grid-side partial converter 14 and the machine-side partial converter 13 to achieve in the pump or turbine operating mode an active power flow in the two directions, from the electrical grid 2 to the rotor 11 in a pump operation and from the rotor 11 to the grid 2 in the turbine operating mode. The control device 38 further controls the water cooling 34 for the converter 8 as well as the air cooling system 37 to appropriately cool the converter 8 and the converter room 36.

In order to store the control logic, associated parameters, the detected operating variables and other data generated during operation, the control device 39 includes a memory device indicated here as block 41.

It should be mentioned that FIG. 1 shows a simplified embodiment of the invention, in which a single converter 8 is arranged in the rotor circuit 12. A plurality of such converters 8 may be arranged via separate or common transformers 21 parallel to one another between the grid 2 and the motor generator device 7 in order to distribute the power flow over a plurality of branches. In addition, numerous other devices, such as a device for limiting the intermediate circuit DC voltage, and others which may normally be included in the double fed induction machine 4 are omitted in FIG. 1 for simplicity and clarity.

Generally, the pumped storage power plant 1 described above operates in the well-known manner such that in times of low grid load, when there is an oversupply of electrical energy in the electrical grid 2, the double fed induction machine 4 is operated in a motor operating mode to drive a pump of the pumping/turbine device 3 to pump a water not shown here in an upper water reservoir. Thereby, the electrical energy of the grid 2 is converted into potential energy of the water and stored. For this purpose, the control device 39 suitably controls the converter 8 to take down and convert the amount of power provided by the grid 2 as optimally as possible. In particular, the control device 39 suitably controls the converter 8 to switch pulse-like sinusoidal voltages and currents corresponding to a current target value of the rotor current frequency to the rotor 11, more specifically the rotor windings to achieve a rotor speed at which the power transmitted via the stator and the rotor corresponds to the power requirement.

In times of high power demand, the potential energy of the water can conversely be converted into mechanical rotational energy of the drive shaft 6 by means of a turbine of the pumping/turbine device 3, so that the rotor 11 is driven in rotation and the generator 7 generates electrical energy that is feed in the grid 2. By controlling the speed n of the rotor 11 both in the pump and in the turbine mode, the desired power (corresponding to a current power target value) can always be taken from the grid 2 and stored or fed back into the grid 2.

As is well known, the angular frequency of rotor voltages and currents in a double fed induction machine is determined by the angular frequency of the stator field and the rotor speed. For angular frequency of the rotor current, the following applies:

$$\omega_R = S\omega_S,$$

where $\omega_S$ is the angular speed of the stator current, which corresponds to the angular speed $\omega_0$, and s is the slip, which is determined by the difference between the synchronous and the mechanical angular speed of the rotor $\omega_m$:

$$S = \frac{\hat{\omega}_S - \hat{\omega}_m}{\hat{\omega}_S}.$$

As can be seen from the above relationships, the angular frequency of the rotor current becomes very small when the slip is nearly zero, i.e., the rotor speed n approaches the synchronous speed no.

As explained in further detail in the above-referenced document by Tan Yingjie et al., "Deadband Control of Doubly-Fed Induction Generator around Synchronous Speed", a low rotor current frequency, when the rotor speed n approaches the synchronous speed $n_0$, has the consequence of high fluctuations and maximum temperature values, which can shorten the service life of the power semiconductor switches used in the rotor-side partial converter 13. In particular, the junction temperature of the power semiconductors reaches its maximum at the synchronous speed when the slip is low and the duration of the temperature cycle is relatively long. The low rotor frequency causes much longer temperature rises and drops, greater peak fluctuations of the temperature and an overall higher thermal load of the power semiconductor switches and other components in the rotor circuit. In this respect, an operation in a certain range around the synchronous speed no, i.e. in a deadband $[n_0-\Delta n, n_0+\Delta n]$, must be avoided. In known pumped storage power plants with double fed induction machines in this context, the tolerance $\Delta n$ corresponding to the thermal limits of the semiconductor devices used is determined in advance before commissioning to ensure that no unacceptable junction temperatures of the semiconductors are caused during operation.

Figure 2:
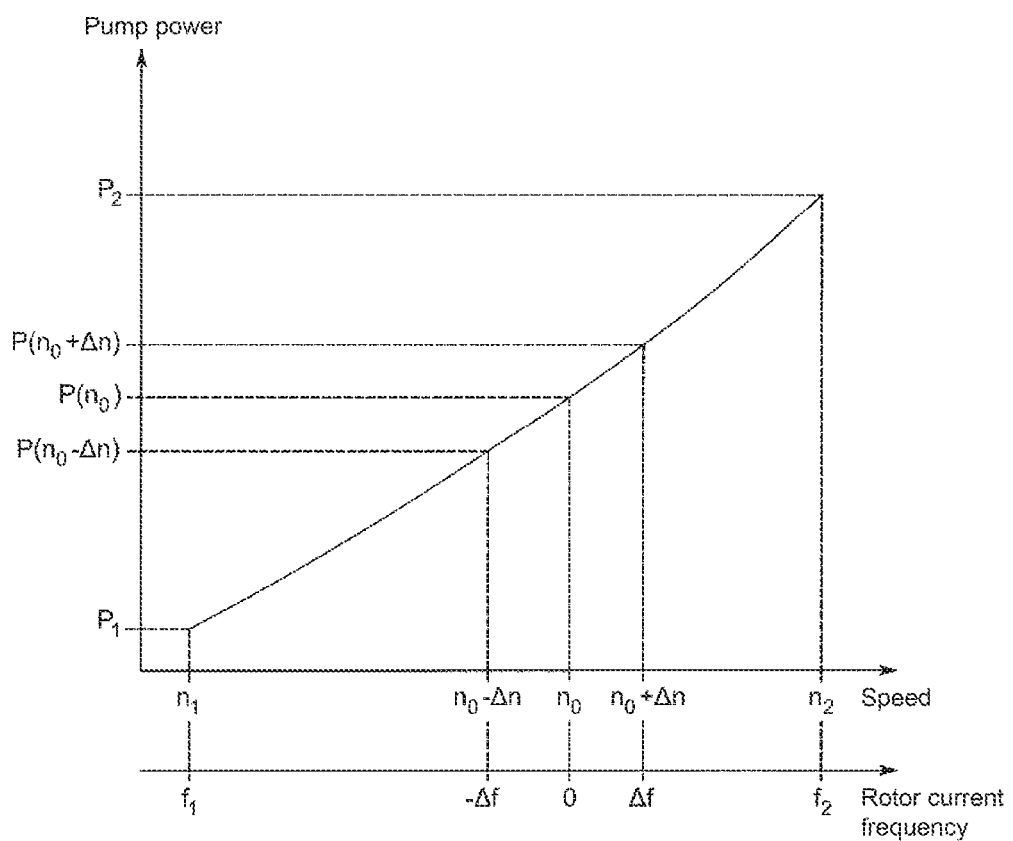
FIG. 2 shows an exemplary characteristic curve, which illustrates the pump power in comparison with the rotor speed and the rotor current frequency for a pumped storage power plant with a double fed induction machine, in a schematic representation.

FIG. 2 shows an exemplary characteristic curve which illustrates the pump power P of the pumped storage power plant 1 as a function of the rotor speed n or the rotor current frequency $f_r$. In general, the double fed induction machine 4 of a pumped storage power plant 1 can be operated in a limited speed range from $n_1$ to $n_2$ around the synchronous speed $n_0$, which corresponds to a power control range of the pump power $P_{min}$ to $P_{max}$. The speed n can be adjusted by impressing a desired rotor current frequency $f_r$. As mentioned above, in a rotor speed range $[n_0-\Delta n, n_0+\Delta n]$ around the synchronous speed $n_0$, the rotor current frequency in the range $[-\Delta f, \Delta f]$ becomes so small that the rotor currents cause a considerable heat load on the semiconductors of the converter 8 and the rotor windings. This generally precludes operation within the synchronous deadband $[-\Delta f, \Delta f]$ of the rotor current frequency. However, this means that the system cannot be used optimally in the pump power range $[P(n_0-\Delta n), P(n_0+\delta\Delta n)]$.

In order to avoid this disadvantage, according to the invention, the inadmissible synchronous deadband $[-\Delta f, \Delta f]$ of the rotor current frequency or $[n_0-\Delta n, n_0+\Delta n]$ of the rotor speed is constantly dynamically determined during operation depending on the respective current conditions of the pumped storage power plant 1. Thereby the synchronous deadband can always be adjusted to the existing conditions and in particular minimized according to the current state of the power plant 1 to allow continuous operation in the vicinity of the synchronous rotor frequency in a portion of the control range of the induction machine, which would be impossible in a fixed predetermined deadband.

Figure 3:
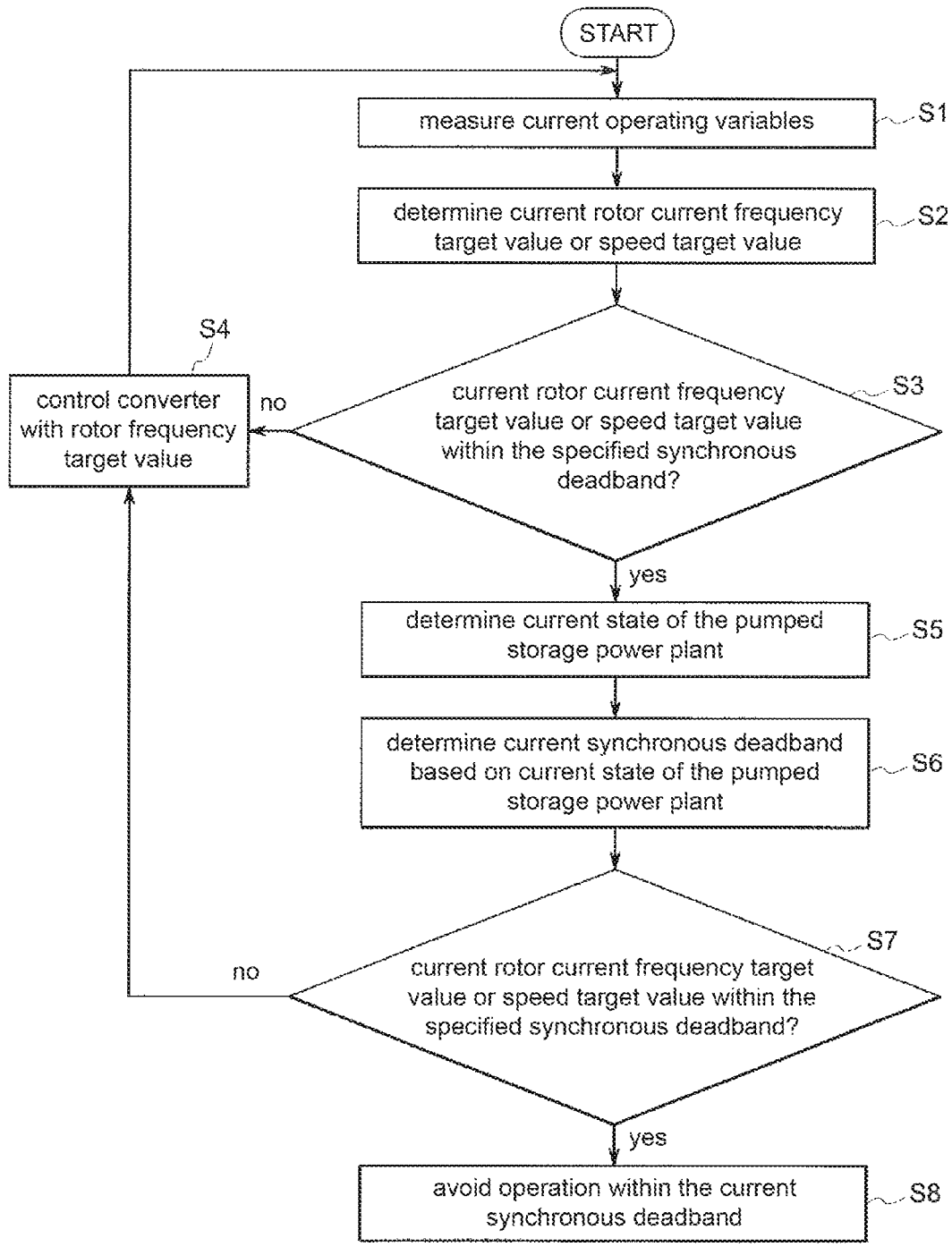
FIG. 3 shows a flow diagram of a method for operating a pumped storage power plant with a double fed induction machine, for example the pumped storage power plant according to FIG. 1, according to an embodiment of the invention, in a simplified representation.

FIG. 3 illustrates a simplified flow diagram of a method according to the invention for operating a pumped storage power plant, for example the pumped storage power plant 1 according to FIG. 1, according to an exemplary embodiment of the invention. In step S1, current operating variables, such as the voltages and currents in the stator circuit 24 and the rotor circuit 12 are measured with, for example, the sensors of the sensor device 38.

In step S2, target values for the current and the voltage to be applied to the rotor winding, including a current target value for the rotor current frequency, based on a target power to be transmitted depending on the measured actual operating variables between the electrical grid, e.g. grid 2, and the double fed induction machine, e.g. the induction machine 4, are determined. The rotor frequency can be determined, for example, based on known relationships between the rotor current frequency and the pump or turbine power, for example based on an exemplary characteristic curve shown in FIG. 2. Alternatively, the target value for the mechanical speed of the rotor 11 can be determined, which is equivalent to the rotor current frequency variable.

In an optional step S3, the thus determined current rotor frequency target value or speed target value can optionally be compared with a predetermined inadmissible synchronous deadband, if such has been predetermined in advance. If the current rotor frequency target value does not fall within the synchronous deadband, the method proceeds with step S4. Otherwise, the method proceeds with step S5.

In step S4, the converter, e.g. the converter 8, is controlled in a modulated manner, e.g. by pulse width modulation, in order to switch pulse-like sinusoidal voltages and currents with the current target value of the rotor current frequency to the rotor. Subsequently, the method returns to step S1.

If the current rotor frequency target value falls within the preset synchronous deadband (yes in step S3) or if step S3 is not performed, then the current state of the pumped storage power plant, e.g. power plant 1, is determined in step S5. The current state of the pumped storage power plant is determined based on one or more characterizing variables including, but not limited to, voltages on the machine side of the converter, currents on the machine side of the converter, the rotor current frequency, the power factor on the machine side of the converter, the voltage on a DC voltage intermediate circuit, e.g. the intermediate circuit 17 of the converter, the pulse pattern used for the control of the converter, the clock frequency used for the control of the converter, an ambient temperature of the converter as measured with the temperature sensor T, a cooling water temperature and/or a cooling water flow rate of the water cooling, e.g. the water cooling 34, of the converter and others. It is also possible to use fixed unchangeable influencing variables or parameters, which may include the design of the semiconductor switches or modules used in the converter, the rated design of the converter, the power semiconductor circuits used (e.g. snubber links not shown here) and/or the known thermal resistances and heat capacities within the components.

The relationships between the variables characterizing a current state of the pumped storage power plant and the inadmissible synchronous deadband can be defined in advance, determined empirically and stored as functions, characteristic curves, look-up tables, implemented algorithms or in another appropriate ways and used online during operation. The determination of the state of the pumped storage power plant, including the variables characterizing this state, can take place continuously, e.g. in each iteration step of the method illustrated in FIG. 3 or only periodically at defined intervals.

In step S6, subsequently the currently inadmissible synchronous deadband is determined based on the current state of the pumped storage power plant depending one or more of the variables characterizing the current state of the pumped storage power plant. Combinations of characterizing variables can be taken into account, which result in the minimum inadmissible synchronous deadband.

Afterwards in step S7 it gets checked, whether the current rotor current frequency target value or speed target value falls in the current synchronous deadband. If this is not the case (no at step S7), the method then proceeds with step S4, in which the converter is controlled in the normal way to generate and apply the desired rotor current and the desired rotor voltage with the current target value of the rotor current frequency on the rotor winding.

If the current rotor current frequency target value or speed target value is within the current synchronous deadband (yes in step S7), measures are taken subsequently in step S8 to avoid operation of the pumped storage power plant within this deadband.

What measures are taken in step S8, depends on the individual needs and requirements of the pumped storage power plant operators. In the simplest case, an operation of the pumped storage power plant 1 could be temporarily suspended until operating points outside the inadmissible synchronous deadband arise again. However, remedial measures are initiated to continue operation of the pumped storage power plant, although at a suboptimal operating point.

Figure 4:
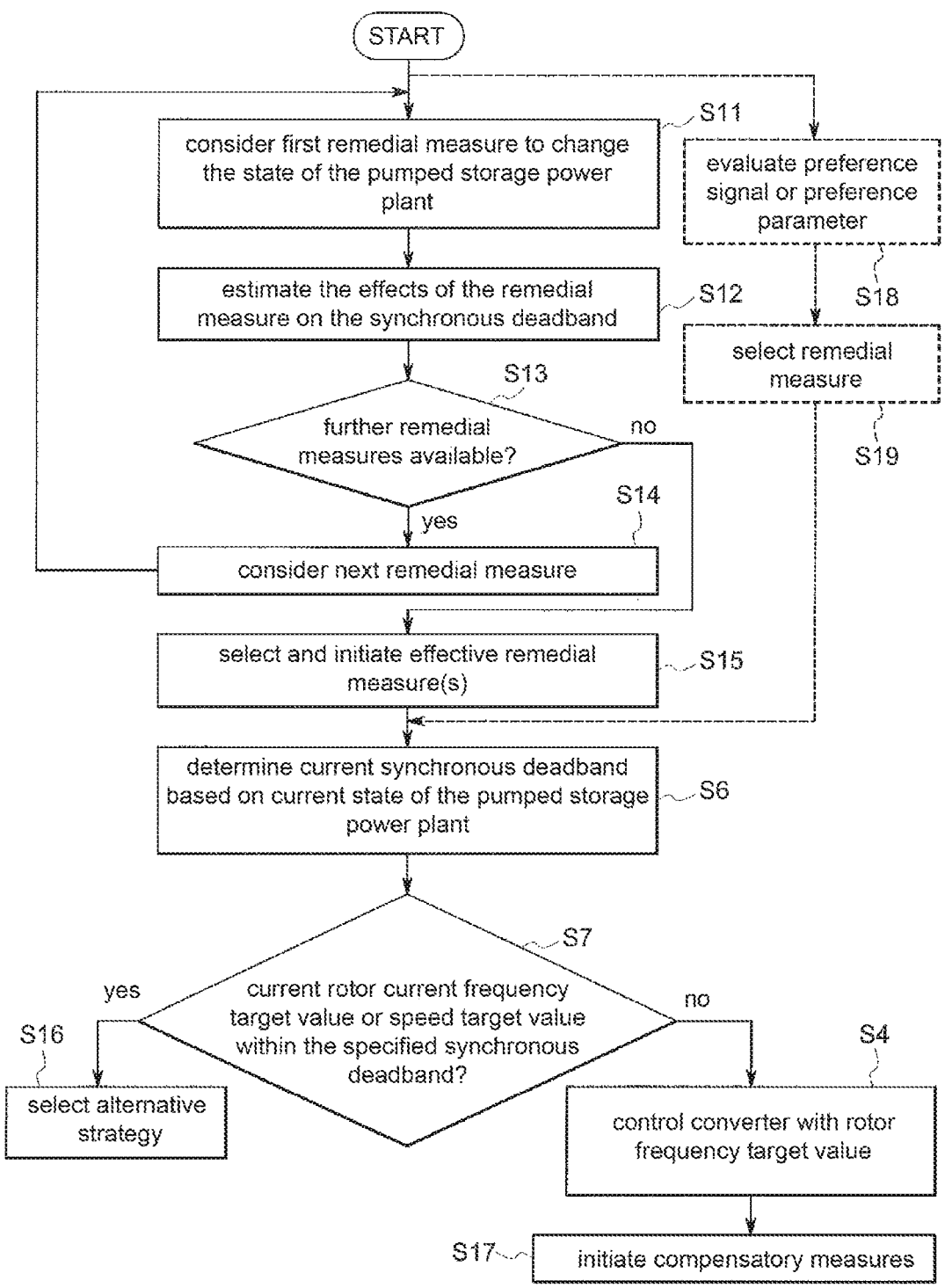
FIG. 4 shows a flow diagram of a modified embodiment of the operating method according to FIG. 3, in a simplified representation.

FIG. 4 shows a development of the method according to the invention according to FIG. 3, which allows the initiation of appropriate remedial measures to continue the operation of the pumped storage power plant at a further reduced momentary inadmissible synchronous deadband. In step S11, a first remedial measure, for example, a first remedial action of a plurality of previously stored remedial measures that is capable of changing the state of the pumped storage power plant is considered. These measures can include e.g. reducing the clock frequency for the control of the converter. A reduced clock frequency for the semiconductor switches of the converter results in lower temperature increases and thus a lower maximum temperature of the semiconductor switches. Alternatively or additionally, a change in the pulse pattern for the control of the converter can be considered. As is well known, various modulation methods, including various pulse width modulation methods, in different converter operating modes and at different clock frequencies, may result in different power losses of the semiconductor elements of the converter and different associated thermal loads. Further, a reduction in the intermediate circuit DC voltage of the converter may be considered, which can also lead to a reduction of the thermal load of the semiconductor elements. Still further, it may be considered to reduce the controlled reactive power, thereby reducing the current and thus the load and temperature of the semiconductor elements and other components of the system. Furthermore, the thermal load can be encountered by a further reduction of a cooling water temperature and/or an increase of the cooling water flow rate in the water cooling of the converter. In addition, it is possible to reduce the ambient temperature in a converter room, e.g. the converter room 36, by increasing the capacity of an air cooling system. The thermal load of the system components can be reduced by each of these measures and thus the state of the system can be changed or improved such that the synchronous deadband can be reduced further.

In step S12, the effects of the remedial measure currently being considered on the synchronous deadband are estimated based on stored relationships. These relationships are either generally known, e.g. data sheets of semiconductor elements or modules, or they may be empirically determined in advance, prior to commissioning of a pumped storage power plant, and stored in a memory, such as the memory device 41, to be used during operation in step S12. These relationships or correlations can be stored as functions, characteristic curves, look-up tables or implemented algorithms or in any other suitable manner.

Step S13 involves checking whether there are further remedial measures, including previously stored relationships between them and the effects on the synchronous deadband, that could be considered. If this is the case (yes in step S13), the next remedial measure is considered in step S14 and the method then returns to step S12 to estimate its effect on the synchronous deadband.

If no further remedial measure is to be considered (no in step S13), subsequently at least one effective remedial measure is selected in step S15 in order to minimize or at least reduce the synchronous deadband. Combinations of several measures can be selected and initiated.

In the subsequent step S6 in accordance with step S6 according to FIG. 3, the currently inadmissible synchronous deadband is determined based on the variables characterizing the current state of the pumped storage power plant.

In step S7, the current rotor current frequency target value or speed target value is checked analogously to determine whether it is within the instantaneous synchronous deadband. If this is the case and if no further remedial measures are available, which could be taken, alternative strategies may be implemented and performed in step S16, including, e.g., operating at a different, suboptimal operating point with reduced power exchange or passing through the synchronous deadband, if an operation within it can be limited to a short, yet acceptable period of time. The operation of the pumped storage power plant can also be temporarily interrupted by temporarily switching off the induction machine 4 and the pumping/turbine device 3.

If the current rotor current frequency target value or speed target value is not within the current synchronous deadband (no in step S7 according to FIG. 4), then in step S4 the converter is appropriately controlled to supply the voltages and currents with the target value of the rotor current frequency for the rotor.

In an embodiment, although optional step S17, compensatory measures can additionally be performed in order to mitigate certain disadvantages or impairments associated with implementing the remedial measures. If, for example, an increased proportion of harmonics in the rotor voltages or currents or increased current ripples are detected, the clock frequency and/or the pulse pattern for the control of the converter can be changed in order to reduce the harmonics and/or current ripples. Alternatively or additionally, in the case where the reactive power regulated in the machine-side partial converter is reduced to reduce the heat load, the smaller available reactive power range can be compensated by using the grid-side partial converter. Other compensatory measures can be provided in step S17.

FIG. 4 further shows a modification of the method according to the invention. As can be seen from the blocks S18 and S19, the effective remedial measure to be initiated to avoid operation within the inadmissible synchronous deadband can be selected depending on a preference signal or parameter. For example, a preference signal can be supplied from the outside or from a central control location to the power plant 1 and, if necessary, evaluated, for example by the control device 39 in step S18. It is also possible for a preference parameter, which characterizes the remedial measure, to be determined in advance, for example during commissioning or a maintenance measure, and stored, for example in the memory device 41 for later use. After the decision on the remedial measure to be initiated has been made in step S19 depending on the preference signal or parameter, the method then proceeds to step S6. The steps S18 and S19 may thus be performed alternatively to the steps S11-S15.

Steps S18 and S19 could also be performed in combination with steps S11-S15, if the external preference signal or the internal preference parameter identifies a plurality of remedial actions, which are then evaluated in accordance with the steps S11-S15, as needed, with regards to their efficacy in reducing the inadmissible deadband under current operating conditions.

Figure 5:
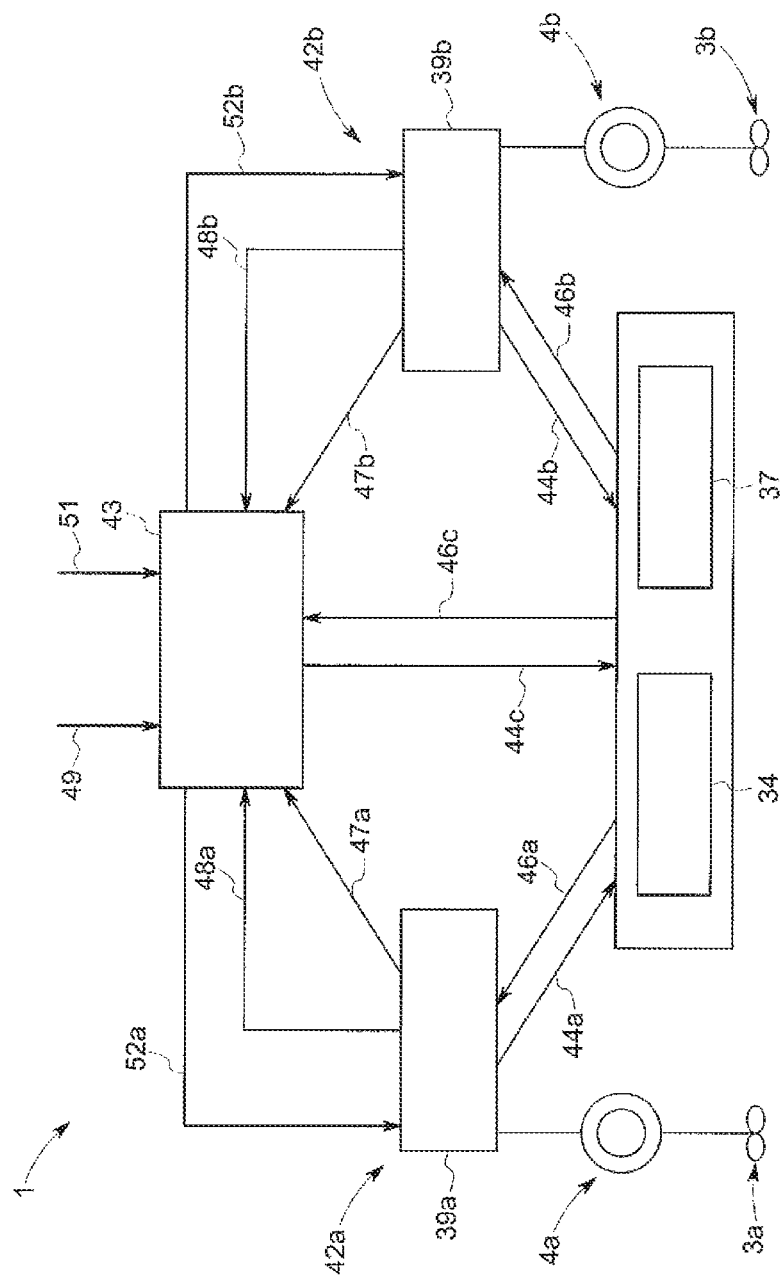
FIG. 5 shows a block diagram of a further embodiment of a system and method for operating a pumped storage power plant with double fed induction machine, in a highly simplified schematic block diagram representation.

FIG. 5 shows a block diagram of a further embodiment of the invention, which allows operation with minimized current synchronous deadband while making maximum use of the power supply of the electrical grid 2. FIG. 5 shows only a highly simplified schematic representation with the relevant function blocks and signal paths that illustrate the functioning of this embodiment.

The difference between the embodiment according to FIG. 5 and the embodiments explained above is that it uses a plurality of pumping/turbine units for optimizing the operation and synchronous deadband. Although only two pumping/turbine units are shown here, the principle applies to any number of pumping/turbine units.

With reference to FIG. 5, the pumped storage power plant 1 here includes a first double fed induction machine 4a, which is connected to the electrical grid 2 via a first converter 8 (not illustrated here) and which is further drivingly coupled to a first pumping/turbine device 3a. For the sake of simplicity, the combination of these components 3a, 4a, 8 should be referred to herein as a first pumping unit 42a, although it may also be used for turbine operation. To control the operation of the first pumping unit 42a, a first control unit 39a is assigned to the control device 39.

Further, a second control unit 39b 39 is provided, which controls the operation of a second pumping unit 42b, which includes a second double fed induction machine 4b with a converter 8 not shown here and a second pumping/turbine device 3b.

An optimization device 43 communicates with the first and the second control unit 39a, 39b and exchanges data with these to set an operation of the two pumping units 42a, 42b such that a continuous, trouble-free operation of the pumped storage power plant 1 in the entire controllable power range with minimized synchronous deadband is made possible. Although FIG. 5 illustrates a higher-level optimization device 43 of the control units 39a, 39b, the control units 39a, 39b could also communicate directly with one another and jointly control the operation of the pumped storage power plant 1.

FIG. 5 further shows a water cooling device 34 and an air cooling system 37 as exemplary auxiliary devices which can be influenced to change the state of the pumped storage power plant 1 in order to optimize the synchronous deadband. For this purpose, the control units 39a, 39b provide corresponding control or regulating commands 44a, 44b to the devices 34, 37 in order to adjust, for example, the flow rate and/or the temperature of the cooling water of the water cooling device 34 or the cooling capacity of the air cooling system 37. The optimization device 43 could also send corresponding control or regulating commands 44c directly to the devices 34, 37.

The water cooling device 34 and the air cooling system 37 in turn report via sensors, not shown here, detected current values of state variables that characterize the state of the devices 34, 37 via signals 46a, 46b or 46c to the first control unit 39a, the second control unit 39b and optionally the optimization device 43.

The control units 39a, 39b each include a logic to estimate the current state of the respective pumping unit 42a, 42b taking into account the received state signals 46a, 46b and other currently measured operating variables, as explained in more detail above in connection with the FIGS. 1-3, to determine a current state-dependent synchronous deadband. This current synchronous deadband is reported by the control units 39a, 39b respectively to the optimization device 43 via corresponding status signals 47a, 47b. In addition, the control units 39a, 39b determine further their controllable reactive power range and report it via corresponding status signals 48a or 48b to the optimization device 43.

The optimization device 43 receives a further input signal, which characterizes the target active power and the target reactive power for taking from the electrical grid and for transmission and storage via the pumping units 42a, 42b in the pump operating mode or for the generation by the devices 42a, 42b and for feeding into the electrical grid 2 when the devices 42a, 42b are operating in turbine mode. The active power and the target reactive power values can be determined, e.g. based on the energy currently provided by the electrical grid 2, by a superordinate control and monitoring function, not shown here, and reported to the optimization device 43 or directly to the control units 39a, 39b. Alternatively, the optimization device 43 or the control devices 39a, 39b can also determine these target values themselves based on currently measured operating variables.

A further, for example external parameter signal 51 can be provided as input signal for the optimization device 43, which indicates the preference of the remedial measure, which the optimization device 43 should take in order to avoid operation in the inadmissible synchronous deadband of the rotor current frequency or the rotor speed and to reduce the deadband. Instead of a, for example, external parameter signal supplied from a remote control center, also a previously stored preference parameter 51, in the simplest case a preference flag, can be used.

The optimization device 43 supplies output signals 52a, 52b to the first and second pumping units 42a, 42b respectively, whereby each output signal 52a, 52b specifies the specific target values for the active power and the reactive power to be controlled by the respective unit 42a, 42b. The optimization device 43 determines these active and reactive power components assigned to the units 42a, 42b based on the total active and reactive power target values or requirements, which it receives via the input signal 49, taking into account the possible reactive power control ranges reported by the units 42a, 42b (status signals 48a, 48b) and the state-dependent current synchronous deadbands of each pumping unit 42a, 42b (status signals 47a, 47b). Depending on a respective preference signal or parameter 51, the optimization device 49 can arbitrarily divide the target values for the active and reactive power to the at least two pumping units 42a, 42b so that these target values can actually be regulated by the units, while an operation of each unit within their current synchronous deadband is avoided. In particular, it is possible to compensate the controllable reactive power range that can be reduced by one of the pumping units 42a, 42b to minimize the synchronous deadband by the other of the pumping units 42a, 42b in order to achieve the required reactive power target value. In addition, the pump units 42a, 42b themselves, depending on the active and reactive power target values given to them corresponding to the signals 52a and 52b, ensure optimization of their respective current deadband in the manner described above in connection with the FIGS. 1-4 including the performance of the suitable remedial measures and, as needed, compensation measures.

Alternatively, the optimization device can, depending on a corresponding preference signal or parameter 51, instruct one of the pumping units 42a or 42b to work using an effective remedial measure with a reduced synchronous deadband, while the other pumping unit 42b or 42a is instructed to work in a normal operating mode.

A method for operating a pumped storage power plant 1 that uses a double fed induction machine 4 with a frequency converter 8 in a rotor circuit 12 is disclosed. The method includes that a current target value for the rotor current frequency is determined based on a target power to be transmitted between an electrical grid 2 and the double fed induction machine 4 depending on measured actual operating variables. The method further includes that a current inadmissible synchronous deadband $[-\Delta f, \Delta f]$; $[n_0-\Delta n, n_0+\Delta n]$ is determined depending on one or more variables characterizing a current state of the pumped storage power plant 4. The synchronous deadband $[-\Delta f, \Delta f]$; $[n_0-\Delta n, n_0+\Delta n]$ is determined by a permissible minimum required rotor current frequency $\Delta f$ or speed difference $\Delta n$ of the rotor speed from the synchronous speed $n_0$ for the stationary operation, which is required to avoid impairments and damage to components of the system due to thermal load. The method further includes the control of the converter to generate voltages and currents with the current target value of the rotor current frequency for the rotor (11) of the induction machine (4) if the current target value of the rotor current frequency or speed does not fall in the current inadmissible synchronous deadband $[-\Delta f, \Delta f]$; $[n_0-\Delta n, n_0+\Delta n]$. A system for operating a pumped storage power plant 1 with a double fed induction machine 4 is also disclosed.

What we claim is:

1. A method for operating a pumped storage power plant with a double fed induction machine including a stator, which is directly connected to an electrical grid, and a rotor, which is directly connected to an electrical grid via a converter, wherein the method includes:
    determining a current target value for the rotor current frequency or a mechanical speed (n) of the rotor based on a target power to be transmitted between the electrical grid and the double fed induction machine depending on measured actual operating variables,
    determining one or more variables characterizing a current state of the pumped storage power plant;
    determining a current inadmissible synchronous deadband ($[-\Delta f, \Delta f]$; $[n0-\Delta n, n0+\Delta n]$), which is determined by a rotor current frequency ($\Delta f$) required for the stationary operation or speed difference ($\Delta n$) of the rotor speed from the synchronous speed (n0), depending on the one or more variables characterizing the current state of the pumped storage power plant;
    controlling the converter in order to switch pulse-like sinusoidal voltages and currents with the current target value of the rotor current frequency to the rotor, if the current target value of the rotor current frequency or mechanical rotor speed does not fall stationary in the current inadmissible synchronous deadband ($[-\Delta f, \Delta f]$; $[n0-\Delta n, n0+\Delta n]$).

2. A method according to claim 1, wherein the current target value of the rotor frequency or the mechanical speed and/or the minimum required rotor frequency or mechanical speed for stationary operation are determined depending on one or more of the following currently measured operating variables: currents (iS) in the stator circuit, voltages (uS) in the stator circuit, currents (iR) on the grid-side in a rotor circuit and/or rotor speed (n).

3. A method according to claim 1, wherein the one or more variables characterizing a current state of the pumped storage power plant are detected and/or determined continuously or periodically.

4. A method according to claim 1, wherein the one or more variables characterizing a current state of the pumped storage power plant include one or more of the following variables: voltages on the machine side of the converter, currents on the machine side of the converter, rotor current frequency, power factor on the machine side of the converter, voltage (UDC) on a DC voltage intermediate circuit of the converter, pulse pattern for the control of the converter, clock frequency for the control of the converter, ambient temperature of the converter, cooling water temperature and/or flow rate for water cooling of the converter.

5. A method according to claim 4, wherein the current state of the pumped storage power plant is further determined taking into account fixed influencing variables, which include one or more of the following: type of the semiconductor switches used in the converter, dimensioning of the converter, power semiconductor circuits used and/or thermal resistances and heat capacities within the components.

6. A method according to claim 4, wherein the relationships between the variables characterizing a current state of the pumped storage power plant and the inadmissible synchronous deadband are stored in advance as functions, look-up tables, implemented algorithms and used during operation.

7. A method according to claim 1, wherein a fixed synchronous deadband is predetermined in advance and a current synchronous deadband is determined only in the case that the current target value of the rotor current frequency or the mechanical speed falls within the predetermined synchronous deadband.

8. A method according to claim 1, wherein in the case that the current target value of the rotor current frequency or the mechanical speed falls into the inadmissible synchronous deadband ([−Δf, Δf]; [n0−Δn, n0+Δn]), a remedial measure is initiated to avoid an operation within the deadband and/or this case is reported to a higher-level control.

9. A method according to claim 8, wherein the remedial measure to be initiated to avoid an operation within the inadmissible synchronous deadband is selected depending on a preference signal or parameter.

10. A method according to claim 8, wherein the remedial measure to be initiated to avoid an operation within the deadband is determined by comparing various possible remedial measures, taking into account their effects on the inadmissible synchronous deadband ([−Δf, Δf]; [n0−Δn, n0+Δn]).

11. A method according to claim 8, wherein the remedial measure includes a reduction of the current synchronous deadband ([−Δf, Δf]; [n0−Δn, n0+Δn]) by changing the state of the pumped storage power plant (1) based on one or more of the following measures:
- reducing a clock frequency for the control of the converter,
- changing the pulse pattern for the control of the converter,
- reducing a voltage (UDC) on a DC voltage intermediate circuit of the converter,
- reducing the controlled reactive power of the converter,
- changing a cooling water temperature and/or a cooling water flow rate for water cooling of the converter, and/or
- reducing the ambient temperature in a converter room using an air cooling system.

12. A method according to claim 8, which further includes compensatory measures to mitigate impairments associated with the remedial measure(s), wherein the compensatory measures include one or more of the following measures:
- changing the clock frequency and/or the pulse pattern for the control of the converter to reduce the harmonics and/or current ripples,
- compensation of a smaller available reactive power range by using a grid-side partial converter of the converter, and/or
- compensation of a smaller available reactive power range and/or a reduced active power in a double fed induction machine using at least one additional double fed induction machine.

13. A system for operating a pumped storage power plant with a double fed induction machine including a stator, which is directly connected to an electrical grid, and a rotor, which is directly connected to an electrical grid via a converter, and with a pumping/turbine device, which is drivingly connected to a double fed induction machine, wherein the system includes:
- a sensor device for measuring current operating variables, including currents (iS, iR) and voltages (uS) in a stator circuit and a rotor circuit; and
- a control device for the control of the operation of the pumped storage power plant, which is communicatively connected to the sensor device and is adapted to determine a current target value for a rotor current frequency or a mechanical speed of the rotor based on a target power to be transmitted between the electrical grid and the double fed induction machine depending on the measured actual operating variables,
- to determine one or more variables characterizing a current state of the pumped storage power plant,
- to determine a current inadmissible synchronous deadband ([Δf, Δf]; [n0−Δn, n0+Δn]), which is determined by a permissible minimum required rotor current frequency (Δf) or speed difference (Δn) of the rotor speed from the synchronous speed (n0) for the stationary operation, depending on the one or more variables characterizing the current state of the pumped storage power plant,
- to control the converter in order to switch pulse-like sinusoidal voltages and currents with the current target value of the rotor current frequency to the rotor, if the current target value of the rotor current frequency or mechanical rotor speed does not fall stationary in the current inadmissible synchronous deadband ([−Δf, Δf]; [n0−Δn, n0+Δn]).

14. A system according to claim 13, wherein the one or more variables characterizing a current state of pumped storage power plant include one or more of the following variables:
voltages on the machine side of the converter, currents on the machine side of the converter, rotor current frequency, power factor on the machine side of the converter, voltage (UDC) on a DC voltage intermediate circuit of the converter, pulse pattern for the control of the converter, clock frequency for the control of the converter, ambient temperature of the converter, cooling water temperature and/or flow rate for water cooling of the converter, and the control device is adapted to determine the current state of the pumped storage power plant based on relationships between the characteristic variables of the one current state of the pumped storage power plant and the inadmissible synchronous deadband, whereby the relationships can be stored in advance in a memory as functions, look-up tables or implemented algorithms.

15. A system according to claim 13, wherein the control device is adapted in the case that the determined target value of the rotor current frequency or mechanical rotor speed falls into the inadmissible synchronous deadband ([−Δf, Δf]; [n0−Δn, n0+Δn]) to initiate a remedial measure to avoid an operation within the deadband, whereby the remedial measure comprises a reduction of the synchronous deadband by changing the state of the pumped storage power plant based on one or more of the following measures:
- reducing a clock frequency for the control of the converter,
- changing the pulse pattern for the control of the converter,
- reducing a voltage (UDC) on a DC voltage intermediate circuit of the converter,
- reducing the controlled reactive power of the converter,
- changing a cooling water temperature and/or a cooling water flow rate for water cooling of the converter, and/or
- reducing the ambient temperature in a converter room by increasing the cooling capacity of an air cooling system;
wherein the remedial measure to be initiated to avoid an operation within the inadmissible synchronous deadband is preferably selected depending on a received preference signal or a previously stored internal preference parameter.

16. A system according to claim 13, wherein the converter includes a grid-side partial converter and a machine-side partial converter, which are connected to one another via a DC voltage intermediate circuit, wherein the control device is adapted to operate the double fed induction machine by reducing the reactive power controlled by the machine-side partial converter with reduced synchronous deadband and to compensate for the reduced available reactive power range by a modified control of the grid-side partial converter.

17. A system according to claim 13, wherein the pumped storage power plant includes a first double fed induction machine which is connected to the electrical grid via a first converter and is drivingly coupled to a first pumping/turbine device, and at least one second double fed induction machine, which is connected to the electrical grid via a second converter and is drivingly connected to a second pumping/turbine device, whereby the control device includes a first control device associated with the first double fed induction machine and at least one second control device, which is associated with the at least one second double fed induction machine, wherein the first and the second control unit are communicatively connected to each other directly or via a higher-level optimization device and adapted to effect as needed:

that at least one of the double fed induction machines is operated with reduced synchronous deadband ($[-\Delta f, \Delta f]$; $[n0-\Delta n, n0+\Delta n]$) by changing the state of the pumped storage power plant, while at least one of the other double fed induction machines is operated in a normal operating mode; and/or that an active power and reactive power requirement predefined by the electrical grid is distributed asymmetrically to the first and the at least one second double fed induction machine to avoid an operation of the double fed induction machines in an inadmissible deadband ($[-\Delta f, \Delta f]$; $[n0-\Delta n, n0+\Delta n]$).

* * * * *